United States Patent Office 3,340,195
Patented Sept. 5, 1967

3,340,195
PROCESS OF ETCHING

Paul F. Borth and Joseph E. McKeone, Park Forest, Ill., assignors to Photo-Engravers Research, Inc., Savannah, Ga., a corporation of Georgia No Drawing. Filed Nov. 16, 1964, Ser. No. 411,603
7 Claims. (Cl. 252—79.1)

The present invention relates to improvement in etching, and more particularly to the development of a so-called "powderless etch" for copper, copper alloys and nickel alloys, by the use of a two-phase system.

In the art of photoengraving, or preparation of relief images by photomechanical means, chemical means are used to effect removal of metal from non-image (non-printing) areas of the plate.

A sheet of metal, which is commonly copper, magnesium or zinc alloy, is prepared by cleaning the metal surface and then coating the same with a light-sensitive lacquer. The coated surface of the plate is then brought into intimate contact wtih a stencil negative of the design to be etched into the plate. This negative is opaque in areas corresponding to metal which is to be removed from the plate, and transparent in areas corresponding to printing surface of the design which it is desired to create.

The photo-sensitive coating is then exposed to light from a high intensity source, frequently a carbon arc, until the coating beneath the transparent positive of the negative has been hardened by actinic radiation. The exposed plate is "developed" to remove lacquer which was not affected by light, and further processed, usually by baking at some appropriate temperature, to finally harden the residual light-hardened lacquer to render it resistant to the action of chemicals to be used in the etching operation.

A relief image is created by etching away chemically, the exposed metal in the areas corresponding to opaque portions of the negative.

In any system of metal removal where the exposed metal surface is simply contacted with an acid or oxidizing agent capable of converting the solid metal to soluble ions, the etching reaction will proceed sideways as well as perpendicular to the metal surface, resulting in a reduction of the width of the protected pattern. This condition is undesirable.

In normal practice, the sideward etching is presented by a procedure in which the plate is etched to a slight depth, such as 0.001", and the image, which is now a relief image, is treated with a fusible resinous powder to leave a protective deposit on all sides of the relief image. The plate is again etched to a depth of perhaps 0.003", and another deposit of resin is applied to the newly exposed portion of the sidewall. This process is repeated until satisfactory depth is reached. This procedure, which is the powder etch system, is slow, requires great skill to perform satisfactorily, and the quality of product may be adversely affected by human or mechanical failure.

In more recent practice, a number of "powerless" etching processes have been developed. These processes, which will be discussed below for further background and understanding of the present invention, have some superficial points of similarity, but are basically different as to chemistry, depending upon the metal being etched. The similarity among these processes, which is in the physical nature rather than the chemical nature, is in fact that all of these processes depend upon the force of etchant propelled against the plate surface, locally removing a protective film created in situ on the surface. While these processes have been quite satisfactory for the etching of zinc and magnesium, the lower chemical reactivity of copper particularly, and also of nickel, have made the processes, until the present invention, unsatisfactory for use on these metals.

The Dow process of powderless etching, which is basically shown in U.S. Patent No. 2,640,765, and which has been improved in subsequent patents, relates to the etching of zinc or magnesium alloys using a dilute solution of nitric acid. This process, in its present state of development, utilizes a combination of an anionic surfactant and an oily phase to provide in a nitric acid etching bath and emulsion which breaks up when the emulsion is projected against the plate surface. Upon contacting the surface, an oil film coats the metal and is stiffened by localized heating, related to the heat of the action, as the active metal replaces hydrogen in the nitric acid. The localized heating stiffens the oil deposit on shoulders and sidewalls of relief characters, protecting them from etching. Thus, the combination of an emulsified oil and localized stiffening, through heat produced by chemical reaction of an oil film, yields a protective effect similar to that of the traditional powdering procedure.

However, as stated above, this process is operable substantially only with either zinc or magnesium. In the case of zinc, specifically, an alternate process involve the use of sulfated castor oil ("Turkey red oil"), with or without an additional surfactant, in combination with oily solvent, such as "Solvesso 150." The operation of this process is similar to that described above, the only significant difference being in the use of sulfated castor oil as a surfactant, this process being specifically applicable to zinc etching and not even applicable to magnesium etching.

The reason that the above processes are not applicable to the etching of copper mainly, and also of nickel, is that these metals are lower in the electromotive series than hydrogen, it cannot be etched by acids, but must instead be attacked by an oxidizing material. In common photoengraving practice, 30–45° Bé. ferric chloride (aqueous solution) is used as an etchant. Alternate etchants, used to some extent in "chemical milling" or in the etching of printed electronic circuits, are aqueous ammonium persulfate or chromic acid solutions.

Prior attempts to provide powderless etching of copper have been only moderably successful. In these processes, thiourea derivatives are dissolved in aqueous ferric chloride solution and are impinged on the surface of the image-bearing copper plate. Cuprous ion ($Cu^+$) is formed as the initial reaction between metallic copper and the oxidizing agent, ferric chloride. This ion can only exist in a boundary-layer film on the metal surface. When cuprous ion contacts a thiourea-type compound an insoluble complex is formed in situ, and tends to adhere to the surface of the metal. This precipitate, which is highly hydrated as a result of having been formed in an aqueous environment, has "gelatinous" characteristics, i.e. it is relatively mobile, viscous, and may be rather readily permeated by various ionic species present in the environment.

The cuprous thiourea complex functions to protect the shoulders and sidewalls of etched characters from direct etching. In open areas, where the etchant spray impinges perpendicular to the surface, the deposit is flushed aside, and direct etching is possible. On the shoulders of relief characters, the etchant spray impinges at an obtuse angle, and lacks sufficient mechanical force to dislodge the protective film. Thus, the objective of powderless etching is attained.

However, the gelatinous nature of the cuprous-thiourea complex presents certain practical limitations to the process. Where the etching time is prolonged, as when extreme depth (e.g. over 0.025") is required, the etchant solution can diffuse through the protective film, and attack the "protected" sidewalls, thus reducing the width of the relief image in an undesirable manner. This particularly creates problems where etching of plates bearing both halftones and coarse line images are etched. The halftone areas are etched to required depth in a few minutes and the screen is filled with the cuprous-thiourea complex. Etching must be continued to achieve the greater depth required for the line images. During the time that the line image is etching to the required depth, the halftone areas are subjected to excessive image loss caused by diffusion of fresh ferric chloride through the deposit of cuprous-thiourea complex entrapped in the screen area. The line images are not affected to a similar degree because the banking agent (cuprous-thiourea complex) formed as etching proceeds is flushed against the sidewalls, where it affords additional protection. Since the newly-formed complex is largely saturated with ferrous ion, produced by reduction of ferric chloride in the removal of copper, there is no oxidant available to attack sidewalls of line characters. It is accordingly, a primary object of the present invention to provide an improvement in the powderless etching of copper, which improvement is also adapted for the powderless etching of nickel alloys, so as to permit a universally applicable system of powderless etching of copper for all types of relief images, to whatever depths are naturally obtained as a result of the fineness of details in the resist image.

It is another object of the present invention to provide a two-phase system of powderless etching of copper and also of nickel alloy, which provides all of the advantages of the known powderless etching systems for magnesium and zinc, but which is specifcally applicable to the more difficult to etch and protect copper and nickel.

It is still another object of the present invention to provide etching baths for the etching of copper and nickel alloys, and particularly for the etching of copper and copper alloy plates.

It is another object of the present invention to provide for the application of the special etching baths of the present invention to the etching of copper and copper alloys, and also to the etching of nickel alloys, by impinging the bath composition onto a copper, copper alloy, or nickel alloy object having portions of its surface masked with a resist coating, in order to achieve effective and complete etching of the surface to all depths necessary as a result of the fineness of detail in the resist image.

Other objects and advantages of the present invention will be apparent upon further reading of the specification and the appended claims.

With the above and other objects in view, the present invention mainly comprises as a bath for the powderless etching copper, copper alloys and nickel alloys, a two-phase system comprising, as essential coactive ingredients, an aqueous ferric chloride solution, a non-ionic surfactant stable in ferric chloride solutions, a thiourea derivative which forms a cuprous-thiourea complex with cuprous ions, and an oil which is non-reactive with the aqueous phase of ferric chloride, surfactant and thiourea derivative.

The two phases of the bath system of the present invention consists in the aqueous phase of water and water soluble components, namely ferric chloride, non-ionic surfactant and thiourea derivative, with the second phase consisting of the oil which may be a saturated ailphatic hydrocarbon, an unsaturated aliphatic hydrocarbon, or an emulsifiable silicone oil, provided that the same is substantially non-reactable with the aqueous phase, these two phases being agitated into an emulsion.

The ferric chloride is preferably used in a concentration between about 20° Bé. (20% $FeCl_3$) to about 48° Bé. (50% $FeCl_3$). The most preferred concentration is about 30° Bé. (30% $FeCl_3$).

Any non-ionic surfactant which is stable in the ferric chloride solution may be used for the purposes of the present invention. Among the preferred non-ionic surfactants are those of the class of polyethylene glycol esters, such as polyethylene glycol 600 (polyethylene glycol ester of oleic acid having a molecular weight of 600) and monolaurate (the polyethylene glycol ether of lauric acid having a molecular weight of 600); nonionic 260 (polyethylene glycol dodecyl-thio ether); Petrowet R (sodium salt of a saturated hydrocarbon sulfonate), and the like, all of these non-ionic surfactants being characterized by stability in aqueous ferric chloride solution. The preferred content of non-ionic surfactant in the bath is between about 0.5–2.0%, with best results being obtained using approximately 1% of the surfactant.

As indicated above, the oils which were used may be saturated hydrocarbons, such as kerosene, unsaturated hydrocarbons such as cottonseed oil, which are largely oleic derivatives, and emulsified silicone oils such as Antifoam 5 (dimethylpolysiloxane). The concentration of the oil in the two-phase system generally varies between about 10–30 cc./liter, more preferably between about 1.5–25 cc./liter, and most preferably about 20 cc./liter.

Any water soluble thiourea derivative which will form a cuprous-thiourea complex with cuprous ions may be used in the compositions of the present invention. Among the most preferred of these derivatives are: formamidine disulfide, which is a dimer of thiourea; formamidine disulfide hydrochloride; ethylene thiourea (it being understood that the term "thiourea derivatives" is meant to include thiourea itself); cuprous thiourea chloride; and mixtures of the above.

The preferred concentration of the thiourea derivative or derivatives in the bath compositions of the present invention is between about 1 gm./liter to about 4 gm./liter, depending upon the force with which the solution impinges on the plate being etched. The most preferred concentration for use with the particular apparatus described in the examples is about 2.4 gm./liter.

The present invention is applicable to the treatment of copper photoengraving plates which may contain about 99.99+% of copper, or which may contain a small amount (about 0.08%) of silver, as well as to true copper alloy photoengraving plates such as brass (up to 40% zinc, balance copper) and beryllium copper (1–4% beryllium, balance copper). This invention is also applicable to the treatment of nickel alloy plates such as "Kovar" (29% nickel, 17% cobalt, 55% iron, 1% other). The nickel appears to react with thiourea derivatives in much the same manner as copper.

The following examples are given to further illustrate the present invention. The scope of the invention is not, however, meant to be limited to the specific details of the examples.

In all of the examples below 30° Bé. ferric chloride solution was used. The saturated hydrocarbon used in the examples was kerosene, in a concentration of 2.5%. The unsaturated hydrocarbon used in the examples was cottonseed oil in a concentration of 2.5%. The emulsified silicone oil (abbreviation: "Sil. Emulsion") was General Electric Company's Antifoam 5, in a concentration of 1.5%.

The non-ionic surfactants used were polyethylene glycol 600-monooleate, and polyethylene glycol 600-monolaurate.

In the examples, the following abbreviations apply:

PERI–13a=a mixture of formamidine disulfide dihydrochloride, ethylene thiourea, and 2,4-diaminophenol dehydrochloride (Amidol);
ETU=ethylene thiourea;
GT–1=formamidine disulfide.

It should be noted that 25.4 microns equal 0.001".

EXAMPLE I

Various specimens of photoengraver's copper, an alloy consisting essentially of pure copper, plus 25–30 oz. of silver/ton of copper were photoprinted with a pattern consisting of a 120 line/inch halftoned gray scale such that the dot diameters varied between 33 microns and 45 microns. Plates were etched in a spray etching machine in which the etchant solution is directed against the surface of the test piece by means of a hard rubber nozzle. A centrifugal pump, powered by a ½ HP electric motor provided a pressure of 12–13 p.s.i., measured at a point immediately below the nozzle.

Plates were etched for 5 minutes, with the etchant temperature 80° F. Bath compositions are indicated in the following table. In every case, small dots were etched completely away, the initial diameter of the smallest remaining dot being related to the amount of sidewall protection provided by the additive to the etching system. Thus, in the following tables, protective effect may be considered inversely related to the initial size of the smallest remaining dot.

TABLE I.—ENGRAVERS COPPER

| Test Plate Number | Oil Phase | Surfactant | Etching Additive | Dot-Size Retained (microns) | Depth (mils) |
|---|---|---|---|---|---|
| 1—640 | | | | 101.6 | 5.0 |
| 2—641 | Sil. Emulsion | | | 100 | 6.5 |
| 638 | Sat. Hydro | Anionic | | 100 | 5.5 |
| 636 | Unsat. Hydro | Cationic | | 100 | 6.0 |
| 639 | Sat. Hydro | do | | 100 | 6.6 |
| 637 | do | Non-ionic | | 100 | 6.0 |
| 635 | Unsat. Hydro | Anionic | | 100 | 3.0 |
| 634 | do | Non-ionic | | 100 | 6.0 |
| 3—621 | | | PERI-13a | 50 | 3.0 |
| 625 | | | ETU | 50 | 3.0 |
| 615 | | | Thiourea | 33 | 2.0 |
| 618 | | | GT-1 | 60 | 3.5 |
| 4—606 | Sil. Emulsion | Non-ionic | ETU | 33 | 4.0 |
| 601 | do | do | PERI-13a | 45 | 4.0 |
| 612 | do | do | Thiourea | 33 | 4.0 |
| 595 | do | do | GT-1 | 33 | 5.0 |

The test plate in Group 1 above show the results obtained when only the aqueous phase is employed to etch a test target: there is no protection against horizontal etching.

The series of test plates in Group 2 employing the aqueous phase and the different oil phases—unsaturated hydrocarbon, saturated hydrocarbon, and a silicone emulsion—also exhibit no protection from said etching.

The Group 3 plates, using aqueous ferric chloride plus the thiourea derivative or derivatives show a lack of depth and rough etching, plus some protection from side etching.

In Group 4, using the aqueous phase; silicone emulsion for the oil phase; non-ionic surfactants, and the thiourea derivative or derivatives adequate protection for horizontal etching, adequate depth, smooth etch, and the maintaining of halftone dots in the 33 micron area are afforded.

EXAMPLE II

Specimen plates of photoengravers brass, a copper-zinc alloy, were photoprinted with a pattern as in Example I. Etching equipment and procedure was as before, with bath composition and results as indicated in Table II.

TABLE II.—BRASS

| Test Plate Number | Oil Phase | Surfactant | Etching Additive | Dot-Size Retained (microns) | Depth (mils) |
|---|---|---|---|---|---|
| 685 | | | | | 7.5 |
| 686 | Sil. Emulsion | | | | 5.5 |
| 687 | do | Non-ionic | | | 3.5 |
| 688 | do | do | GT-1 | 62 | 3.5 |
| 589 | do | do | GT-1 | 55 | 3.0 |

The data in Table II indicates that copper-zinc alloys behave in the same fashion as did the photoengravers copper used in tests to prepare Table I.

EXAMPLE III

In the practice of etching circuit boards with ferric chloride in which the pattern is defined by means of a pattern of gold or other noble metal plated onto the surface of copper foil, an electrolytic couple effect operates to cause the etchant to severely undercut the gold image, with the result that the copper conducting elements become substantially smaller in dimension than the gold image which is used to define the etched areas. A circuit board, consitsing of a layer of copper foil laminated to a non-conducting plastic sheet, with a circuit pattern defined by a gold plated image on the copper surface, was etched in a bath as defined in Table III. Results are indicated.

TABLE III.—GOLD PLATED-COPPER PRINTED CIRCUIT BOARD

| Test Plate Number | Oil Phase | Surfactant | Etching Additive | Dot-Size Retained (microns) | Depth (mils) |
|---|---|---|---|---|---|
| 704 | Sil. Emulsion | Non-ionic | GT-1 | | |

The combination bath protected the copper from undercutting under the gold and helped prevent side etching.

EXAMPLE IV

Procedure was similar to that of Examples I and II, except that the test pattern was photoprinted onto a sheet of beryllium copper alloy. Data are given in Table IV.

TABLE IV.—BERYLLIUM COPPER

| Test Plate Number | Oil Phase | Surfactant | Etching Additive | Dot-Size Retained (microns) | Depth (mils) |
|---|---|---|---|---|---|
| 697 | Sil. Emulsion | Non-ionic | GT-1 | 55 | 4.0 |
| 702 | do | do | GT-1 | 45 | 4.5 |

Table IV indicates that the concentration of the copper bearing alloy is indicative of the amount of additive to be used.

In all of the above examples, the concentration of the thiourea or thiourea derivative was 2.4 gm./liter.

Without further analysis, the foregoing will so fully reveal the gist of the present invention that others can, by applying knowledge readily available to those skilled in the art, modify the invention without, however, departing from the inventive concept. Such modifications are meant to be comprehended within the scope of the appended claims.

What is new and desired to be secured by Letters Patent is:

1. A method of etching an object of a metal selected from the group consisting of copper and copper alloys said object having at least a portion of its surface masked with a resist coating, which comprises impinging upon the surface of the object an etching composition consisting essentially of an emulsion of an aqueous solution of ferric chloride, a non-ionic surfactant stable in ferric chloride solution and a water-soluble thiourea derivative adapted to form a cuprous-thiourea complex with cuprous ions, mixed with an oil selected from the group consisting of saturated hydrocarbon oils, unsaturated hydrocarbon oils and emulsified silicon oils which is immiscible with and non-reactive with said aqueous solution.

2. A method according to claim 1, in which said metal object is a copper plate.

3. A method according to claim 1, in which said metal object is a plate of a copper alloy.

4. A method according to claim 1, in which said thiourea derivative is selected from the group consisting of formamidine disulfide, formamidine disulfide hydrochloride, ethylene thiourea, thiourea and cuprous-thiourea chloride.

5. A method according to claim 1, in which the concentration of ferric chloride is between about 20–48° Bé., the thiourea derivative is present in amounts of between about 1–4 grams per liter, and in which the oil is present in an amout of about 10–30 cc. per liter.

6. A method according to claim 4, in which the concentration of ferric chloride is between about 20–48° Bé., the thiourea derivative is present in amounts of between about 1–4 grams per liter, and in which the oil is present in an amount of about 10–30 cc. per liter.

7. A method according to claim 1, in which the aqueous solution and the oil are agitated with each other prior to being impinged upon the surface of said object so that the aqueous solution and oil are well emulsified.

References Cited

UNITED STATES PATENTS

| | | | |
|---|---|---|---|
| 2,628,199 | 2/1953 | Lowenheim | 252—149 X |
| 2,640,764 | 6/1953 | Easley et al. | 252—79.2 |
| 3,033,725 | 5/1962 | Daugherty et al. | 156—14 |
| 3,033,793 | 5/1962 | Bradley et al. | 156—14 X |
| 3,105,783 | 10/1963 | Parkinson | 156—14 |
| 3,136,670 | 6/1964 | Rogers et al. | 156—14 X |
| 3,148,100 | 9/1964 | Elston | 156—14 |

FOREIGN PATENTS

| | | |
|---|---|---|
| 866,249 | 4/1961 | Great Britain. |

LEON D. ROSDOL, *Primary Examiner.*

SAMUEL H. BLECH, *Examiner.*

M. WEINBLATT, *Assistant Examiner.*